(12) United States Patent
Doebertin et al.

(10) Patent No.: US 7,262,957 B2
(45) Date of Patent: Aug. 28, 2007

(54) MODULAR COMMUNICATION FIXTURE FOR INSTALLATION ON BOARD OF A PASSENGER CONVEYANCE

(75) Inventors: Oliver Doebertin, Hamburg (DE); Hermann Schotte, Buxtehude (DE); Regine Fischer, Ilshofen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/583,391

(22) Filed: Oct. 18, 2006

(65) Prior Publication Data
US 2007/0035919 A1 Feb. 15, 2007

Related U.S. Application Data

(63) Continuation of application No. 10/785,601, filed on Feb. 23, 2004, now Pat. No. 7,142,417.

(30) Foreign Application Priority Data
Feb. 24, 2003 (DE) ............................... 103 07 958

(51) Int. Cl.
*G06F 1/16* (2006.01)
(52) U.S. Cl. ................ 361/683; 244/129.1; 244/129.5; 312/223.1
(58) Field of Classification Search ........ 361/679–683, 361/724–727; 244/117, 118.6, 129.1, 129.5; 312/223.1, 223.2, 223.3
See application file for complete search history.

(56) References Cited

U.S. PATENT DOCUMENTS

| | | | |
|---|---|---|---|
| D155,335 S * | 9/1949 | Delcher, Jr. et al. ....... D12/195 |
| 4,478,467 A | 10/1984 | Tyndall | |
| 4,736,998 A | 4/1988 | Wilson et al. | |
| 4,818,854 A | 4/1989 | Davies et al. | |
| 5,024,398 A * | 6/1991 | Riedinger et al. ....... 244/118.5 |
| 5,282,341 A * | 2/1994 | Baloga et al. ................. 52/32 |
| 5,393,964 A | 2/1995 | Hamilton et al. | |
| 5,927,835 A | 7/1999 | Mergold et al. | |
| 6,078,848 A | 6/2000 | Bernstein et al. | |
| 6,290,181 B1 * | 9/2001 | Gadd et al. .............. 244/171.9 |
| 6,475,087 B1 | 11/2002 | Cole | |
| 6,487,280 B1 | 11/2002 | Akinbi | |
| 6,646,863 B1 | 11/2003 | White et al. | |

FOREIGN PATENT DOCUMENTS

EP 0 600 822 6/1994

* cited by examiner

*Primary Examiner*—Jayprakash Gandhi
*Assistant Examiner*—Anthony Q Edwards
(74) *Attorney, Agent, or Firm*—W. F. Fasse; W. G. Fasse

(57) ABSTRACT

A modular communication fixture is installed in a passenger aircraft adjacent to an entrance and exit area adjoining a passenger boarding door. The fixture includes a housing, at least one access door that is selectively movable to an open position and a closed position relative to the housing, an information and communication terminal arrangement that is installed at least partly in the housing and that includes a control section, and a seat that is adapted to support a person seated thereon and that is arranged movable into and out of the housing. In the open position, the at least one access door permits access to the control section and the seat, and extends into the entrance and exit area. In the closed position, the at least one access door prohibits access to the control section and the seat, and does not obstruct the entrance and exit area.

10 Claims, 2 Drawing Sheets

MODULAR COMMUNICATION FIXTURE FOR INSTALLATION ON BOARD OF A PASSENGER CONVEYANCE

CROSS-REFERENCE TO RELATED APPLICATION

This application is a Continuation of application Ser. No. 10/785,601 filed Feb. 23, 2004 now U.S. Pat. No. 7,142,417, the entire disclosure of which is incorporated herein by reference.

PRIORITY CLAIM

This application is based on and claims the priority under 35 U.S.C. §119 of German Patent Application 103 07 958.0 filed on Feb. 24, 2003, the entire disclosure of which is incorporated herein by reference.

FIELD OF THE INVENTION

The invention relates to a modular communication fixture constructed for installation on a passenger conveyance such as an aircraft, a train, or a ship. The fixture includes components for use by passengers and other components for use by a personnel member.

BACKGROUND INFORMATION

Conventional fixtures of the above mentioned general type have only the capability of an audio/video control center in an aircraft. The center is constructed for operation by the cabin personnel and does not provide any services for individual passengers. A conventional center is frequently installed in a luggage compartment or in a stowing cabinet where it takes up space that could otherwise be used for luggage and/or clothing. Moreover, a conventional center of this type serves exclusively for the cabin specific controls by personnel, but does not provide any conveniences for the passengers.

Other conventional terminals of this kind that are constructed for the convenience of customers are not installed in a transport conveyance, but rather in buildings, such as banks offering an automatic teller, or in train stations offering automatic ticket vending machines, or in airports offering flight insurance policies and so forth. It is also known to equip a sleeping car on a train, for example, with an information center including bar counter elements. A train attendant may temporarily be positioned behind such a counter where the attendant can reach individual sleeping cabins by telephone. Generally, these terminals or information centers have a rather rigid construction which requires a substantial space for installation. Additionally, conventional fixtures of this kind are quite heavy and therefore not suitable for installation in a passenger aircraft.

Objects of the Invention

In view of the foregoing it is the aim of the invention to achieve the following objects singly or in combination:

- to construct a modular information fixture for installation in an aircraft that will provide information and communication facilities for passengers and control functions to be performed by conveyance personnel, whereby the fixture is capable of performing multiple functions on the conveyance, particularly on board an aircraft;
- the fixture shall be of compact and lightweight construction, particularly for use in commercial passenger aircraft, and also take up as little space as possible; and
- the fixture must have a divided access feature so that certain passenger conveniences are accessible by passengers and personnel while other features, particularly cabin control features, are accessible only by a member of the personnel, but not by a passenger.

SUMMARY OF THE INVENTION

The above objects have been achieved according to the invention in a modular communication fixture constructed for installation on board of a passenger transport conveyance such as a passenger aircraft. However, the attainment of the above objects is not a required feature or limitation of the claimed invention.

In one embodiment according to the invention, a modular communication fixture is installed in a passenger aircraft adjacent to an entrance and exit area adjoining a passenger boarding door. The fixture includes a housing, an access door arrangement with at least one access door that is selectively movable to an open position and a closed position relative to the housing, an information and communication terminal arrangement that is installed at least partly in the housing and that includes a control section, and a seat that is adapted to support a person seated thereon and that is arranged movable into and out of the housing. In the open position, the at least one access door permits access to the control section and the seat, and extends into the entrance and exit area. In the closed position, the at least one access door prohibits access to the control section and the seat, and does not obstruct the entrance and exit area.

The present communication fixture is characterized by a housing, and an information and communication terminal installed in the housing for use by passengers or personnel, and further optional features as follows. The terminal comprises a control and monitoring section installed in the housing for use by personnel, and a passenger service section installed in the housing for use by passengers. The housing is preferably a frame or enclosure provided with multi-function components to form an information terminal. The modular communication fixture is preferably installed in the entrance and exit area adjoining a passenger boarding door of a passenger aircraft to thereby achieve the advantage of using space that heretofore has not been taken up by cabin fixtures. Further, the entrance and exit area of an aircraft will not be noticeably diminished by the compact construction of the present modular unit. Thus, space in an overhead luggage compartment or in a clothing closet is saved. Moreover, passengers boarding the aircraft can immediately see information regarding how to proceed to their seats, on a display screen of the modular communication fixture. During flight the modular fixture in its opened state serves as a work station for a cabin attendant for performing several functions such as an information center, a cabin system control center, and a video/audio control center. In addition to the components primarily intended for use by cabin attendants during flight, the modular communication fixture further comprises service elements for passenger conveniences, such as information regarding connecting flights, a telephone access center, and the possibility of retrieving information from the internet or transmitting information in the form of e-mail through the internet and even making hotel reservations.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

A modular fixture in the form of an information or communication terminal according to the invention functions as a central unit for the input and recall of information when the passenger conveyance is in operation. Such a modular fixture serves as a passenger convenience and as a terminal or work station for the control of cabin features, for example adjustable cabin climate values, illumination requirements, public announcements, and so forth. When the information terminal functions as a passenger service convenience it may, for example, provide information relating to connecting flights, to hotel reservations, and it may function as a telephone exchange station, and as a website for sending e-mails and so forth.

Figure 1:
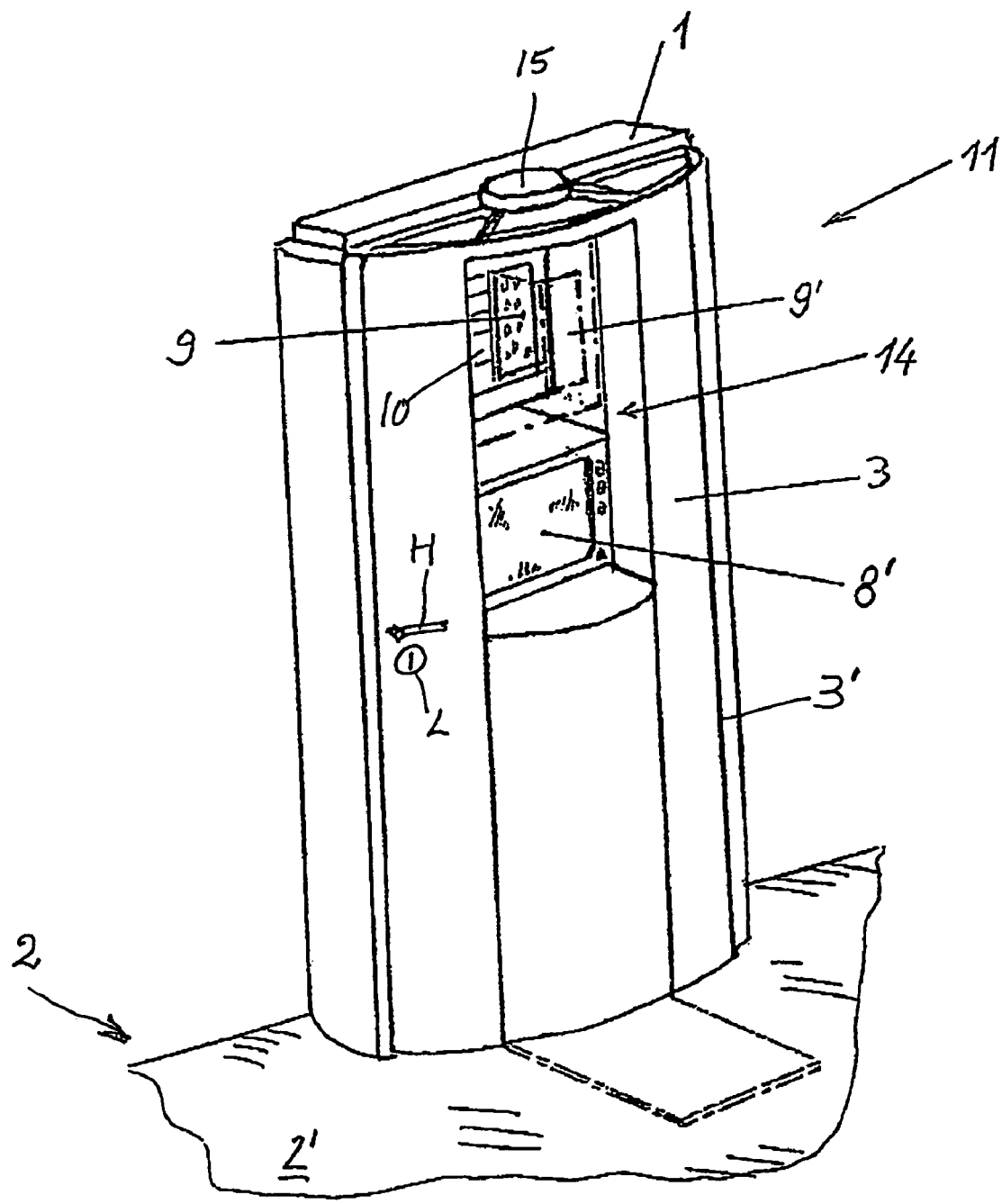
FIG. 1 is a perspective view of the modular communication fixture according to the invention with its door closed.

FIG. 1 shows the present modular communication fixture 11 installed in a cabin entrance and exit area 2 on the floor 2'. The modular fixture 11 comprises a housing, for example in the form of a frame 1 closeable by a door 3 secured to the frame 1 for example by a hinge 3'. The door 3 has a lock L and a handle H. The lock L ensures that passengers will not have access to fixture components which are intended for access only by flight personnel, as will be described in more detail below. The door has an opening 14 that provides access to a touchscreen 9 since the user can reach trough the opening 14. The touchscreen 9 can assume two positions, namely a pulled-out forward position 9 and a recessed position 9'. In the forward position of the touchscreen 9 it covers a forward attendant panel (CIDS) 10. Similarly, a display screen 8 such as a television screen can assume a recessed position 8 or a forward position 8'. In the forward position the display screen 8 can be viewed through the opening 14 in the door 3. Similarly, the touchscreen is accessible through the opening 14 when the screen is in the forward position 9'. Passengers entering the entrance and exit area 2 can view the display screen in its forward position 8' to obtain direction information as to how to proceed to their seats.

Figure 2:
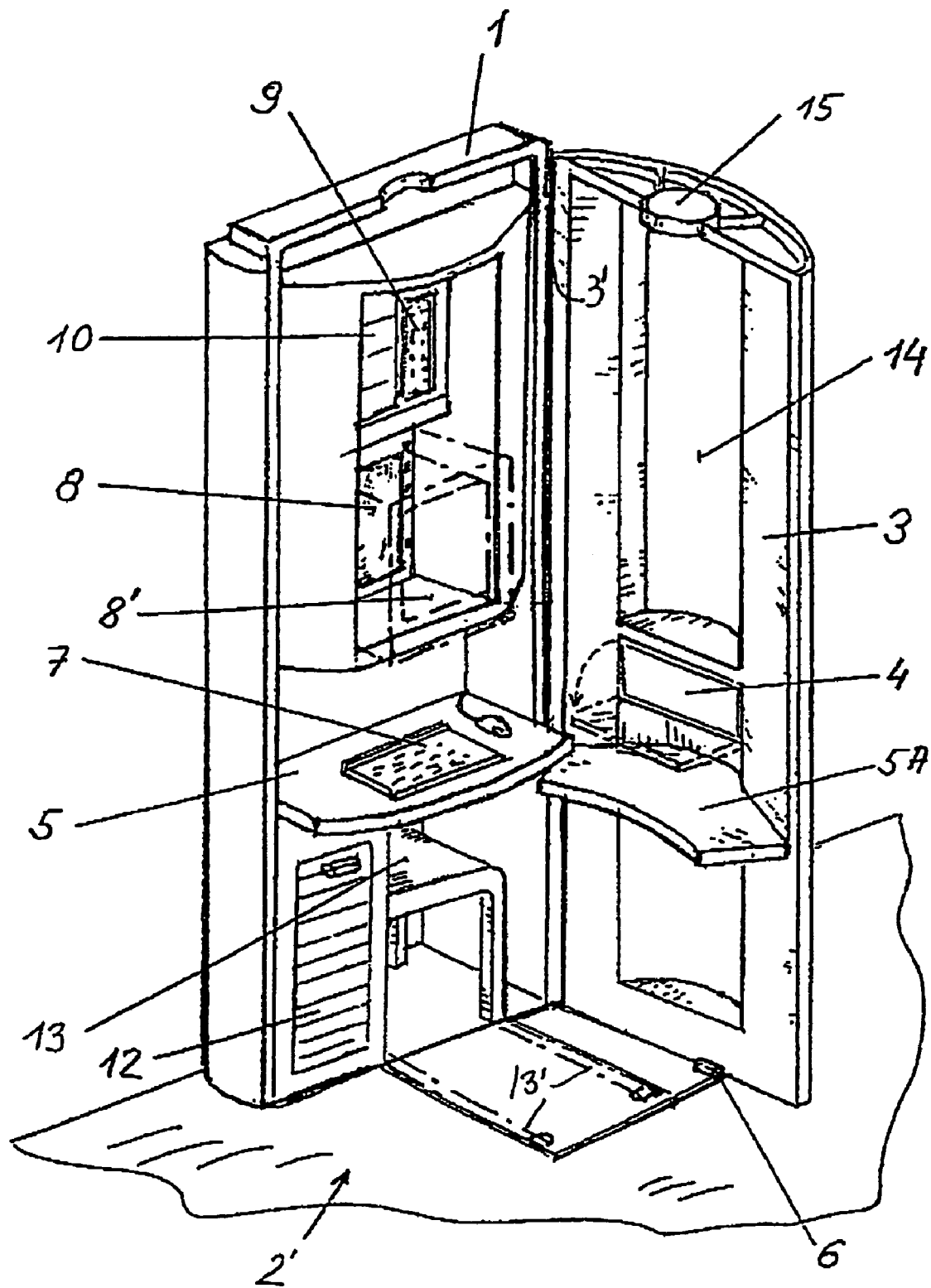
FIG. 2 is a view similar to that of FIG. 1 showing the modular fixture with its door opened.

Referring to FIG. 2, the box frame 1 of the modular fixture 11 is dimensioned to be compatible with aircraft cabin dimensions. For example, the fixture may have the dimension of 650 mm×1400 mm×2100 mm. Such a dimension does not impair the free movement of passengers and crew in the area 2. The door 3 is preferably molded outwardly and carries itself certain components, for example, a flap top 4 that serves as a cup holder or as a minibar feature, a work support 5A and at least one lamp 15. The work support plate 5A is mounted at a level slightly lower than a keyboard support 5 carrying a keyboard 7. Thus, the work support 5A can slide under the keyboard support 5 when the door 3 is closed. Preferably, a hinge 3' permits opening the door by 90°. In its open position the door 3 is locked in place by a lock 6. A stool 13 is positioned in the space below the keyboard support 5 and can be moved out of its storage space, preferably along guide rails 13' when the door 3 is opened. The stool is also lockable in both positions.

The above mentioned screens such as the television or display screen 8 and the touch screen 9 are so positioned that they can be seen and used through the opening 14 in the door 3. The forward attendant panel 10 is accessible to a flight attendant only when the door is open. Further components housed in the fixture, but not shown, include for example a computer, DVD drives, a fax machine, a scanner, CD-ROM drives, and other accessory components. A space 12 for storage is provided next to the stool 13. The storage space 12 may itself have a door, for example a roll-up door. All movable components such as the door 3, the stool 13, the display screen 8, and the touch screen 9 are lockable in their respective end positions, that is in the recessed position as well as in the forward use position. The shiftability of the just mentioned components permits working with the fixture either sitting or standing when the fixture is open, thus providing a work station for an attendant. A passenger can use the fixture only while standing and with the door 3 closed. The lamp 15 distributes light downwardly and also inwardly toward the touchscreen 9.

During take-off and landing, the modular fixture 11 is closed as shown in FIG. 1, whereby the components 8 and 9 are shifted into the forward position 8' and 9' respectively, if desired. In this position a flight attendant may also control the components through the opening 14. Additionally, the components are better visible for entering passengers to see displayed information. The same holds true when passengers leave the aircraft, whereby airline videos or information videos may be shown, for example giving weather information for the arrival port. During flight, the fixture 11 is opened and functions as an information center, whereby a cabin attendant may use the stool 13. Thus, it is possible to control the cabin functions such as illumination and temperature. Simultaneously, convenience services may be provided for the passengers, such as requesting information within the aircraft through an aircraft intranet and providing connections to the internet, whereby documents may be printed through a fax machine or informations for connecting flights and hotel reservations may be provided in the form of a hard copy.

Due to the fact that during take-off and landing the door 3 is closed, the present modular fixture does not interfere with the boarding and exiting of the passengers. Thus, the entrance and exit area is used more efficiently and cabin storage space is saved while providing, during flight, a work station for a flight attendant or other attendant in a passenger conveyance, and convenience services for passengers.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination comprising a passenger aircraft and a modular communication fixture installed on board of said passenger aircraft adjacent to an entrance and exit area adjoining a passenger boarding door of said aircraft, wherein said modular communication fixture comprises a housing, at least one access door that is respectively selectively movable to an open position and to a closed position relative to said housing, an information and communication terminal arrangement that is installed at least partly in said housing and that includes a control section, and a seat that is adapted to support a person seated thereon and that is arranged movable into and out of said housing, wherein said at least one access door in said open position permits access to said control section and to said seat, and extends into said entrance and exit area, and wherein said at least one access door in said closed position prohibits access to said control section and to said seat, and does not obstruct said entrance and exit area.

2. The combination according to claim 1, wherein said control section comprises a keyboard.

3. The combination according to claim 2, wherein said information and communication terminal further comprises a display screen.

4. The combination according to claim 3, wherein said display screen is arranged movably relative to said housing so as to be movable between a recessed position and a forward position relative to said housing.

5. The combination according to claim 3, wherein said display screen remains visible both when said at least one access door is in said open position and when said at least one access door is in said closed position.

6. The combination according to claim 2, further comprising a horizontal support surface arranged under said keyboard, and a space provided below said horizontal support surface, wherein said seat is selectively movable into and out of said space.

7. The combination according to claim 1, wherein said seat extends into and at least partly obstructs said entrance and exit area when said seat is moved out of said space.

8. The combination according to claim 1, wherein said at least one access door consists of a single door that mutually prohibits access to both said control section and said seat in said closed position.

9. The combination according to claim 1, wherein said control section is arranged to be accessed and used only by authorized aircraft personnel of said aircraft, and said information and communication terminal arrangement further includes a passenger service section comprising a display screen that is arranged to be accessed and used by passengers and the authorized aircraft personnel of said aircraft.

10. A combination comprising a passenger aircraft and a modular communication fixture installed in said aircraft adjacent to an entrance and exit area adjoining a passenger boarding door of said aircraft, said modular communication fixture comprising a housing, an access door arrangement that is selectively movable to an open position and to a closed position relative to said housing, an information and communication terminal installed in said housing for use by passengers and personnel of said aircraft, and a stool, wherein said terminal comprises a control and monitoring section and a passenger service section for use and accessible by the passengers and personnel, wherein said access door arrangement in said open position permits access to said stool and said control and monitoring section and obstructs said entrance and exit area, and said access door arrangement in said closed position prohibits access to said stool and said control and monitoring section and does not obstruct said entrance and exit area.

* * * * *